US007275032B2

(12) United States Patent
Macleod

(10) Patent No.: US 7,275,032 B2
(45) Date of Patent: Sep. 25, 2007

(54) TELEPHONE CALL HANDLING CENTER WHERE OPERATORS UTILIZE SYNTHESIZED VOICES GENERATED OR MODIFIED TO EXHIBIT OR OMIT PRESCRIBED SPEECH CHARACTERISTICS

(75) Inventor: John B. Macleod, Virginia Beach, VA (US)

(73) Assignee: Bvoice Corporation, Virginia Beach, VA (US)

( * ) Notice: Subject to any disclaimer, the term of this patent is extended or adjusted under 35 U.S.C. 154(b) by 930 days.

(21) Appl. No.: 10/423,730

(22) Filed: Apr. 25, 2003

(65) Prior Publication Data

US 2004/0215451 A1 Oct. 28, 2004

(51) Int. Cl.
*G10L 15/06* (2006.01)
(52) U.S. Cl. .................. 704/243; 704/275; 379/88.01; 379/88.04; 379/88.13
(58) Field of Classification Search ................ 704/275, 704/243, 270.1; 379/88.01, 88.04, 76.1, 379/88.13; 279/88.13
See application file for complete search history.

(56) References Cited

U.S. PATENT DOCUMENTS

| 4,343,969 A | 8/1982 | Kellett ........................... 179/1 |
| 4,813,076 A | 3/1989 | Miller .......................... 381/43 |
| 4,820,059 A | 4/1989 | Miller et al. ................... 381/43 |
| 4,918,322 A * | 4/1990 | Winter et al. .............. 379/67.1 |
| 5,060,263 A | 10/1991 | Bosen et al. ................... 380/25 |
| 5,224,150 A | 6/1993 | Neustein ....................... 379/57 |
| 5,267,149 A | 11/1993 | Anada et al. ............... 364/408 |
| 5,400,434 A | 3/1995 | Pearson ..................... 395/2.73 |
| 5,473,667 A | 12/1995 | Neustein ....................... 379/57 |
| 5,479,488 A * | 12/1995 | Lennig et al. ........... 379/88.04 |

(Continued)

FOREIGN PATENT DOCUMENTS

EP 780 805 6/1997

(Continued)

OTHER PUBLICATIONS

Sen, A.; Samudravijaya, K. Indian Accent Text-To-Speech System For Web Browsing; Sadhana vol. 27, pt. 1 p. 113-26; Feb. 2002.

(Continued)

*Primary Examiner*—Vijay B. Chawan
(74) *Attorney, Agent, or Firm*—Michael A. Glenn; Glenn Patent Group

(57) ABSTRACT

A human operator's voice is artificially varied prior to transmission to a remote caller. In one example, the operator indicates target speech content (e.g., actual speech, pre-prepared text, manually entered text) to a speech processing facility, which enunciates the target speech content with an output voice that exhibits prescribed speech characteristics (e.g., accent, dialect, speed, vocabulary, word choice, male/female, timbre, speaker age, fictional character, speech particular to people of a particular geographic region or socio-economic status or other grouping). Another example is an automated call processing system, where an output voice is selected for each incoming call and information is interactively presented to callers using the output voice selected for their respective calls. In another example, a speech processing facility intercepts the operator's speech, manipulates the waveform representing the operator's intercepted speech to add or remove prescribed characteristics, and transmits an enunciated output of the manipulated waveform to the caller.

48 Claims, 3 Drawing Sheets

U.S. PATENT DOCUMENTS

| | | | |
|---|---|---|---|
| 5,561,736 A | 10/1996 | Moore et al. ............... | 395/2.69 |
| 5,564,038 A | 10/1996 | Grantz et al. ............... | 395/491 |
| 5,574,786 A | 11/1996 | Dayan et al. .................. | 380/4 |
| 5,590,198 A | 12/1996 | Lee et al. ...................... | 380/21 |
| 5,636,325 A | 6/1997 | Farrett ....................... | 395/2.67 |
| 5,680,443 A * | 10/1997 | Kasday et al. ........... | 379/88.13 |
| 5,710,889 A | 1/1998 | Clark et al. .................. | 395/244 |
| 5,711,000 A | 1/1998 | Ploeg et al. ................ | 455/423 |
| 5,712,973 A | 1/1998 | Dayan et al. ............... | 395/186 |
| 5,719,996 A * | 2/1998 | Chang et al. ............... | 704/256 |
| 5,724,526 A | 3/1998 | Kunita ........................ | 395/277 |
| 5,758,341 A | 5/1998 | Voss ........................... | 707/10 |
| 5,771,347 A | 6/1998 | Grantz et al. ............... | 395/186 |
| 5,793,952 A | 8/1998 | Limsico ................. | 395/188.01 |
| 5,821,933 A | 10/1998 | Keller et al. ................ | 345/348 |
| 5,832,441 A | 11/1998 | Aaron et al. ................ | 704/276 |
| 5,865,626 A | 2/1999 | Beattie et al. .............. | 434/185 |
| 5,890,140 A | 3/1999 | Clark et al. .................... | 705/35 |
| 5,895,447 A | 4/1999 | Ittycheriah et al. ......... | 704/231 |
| 5,918,007 A | 6/1999 | Blackledge, Jr. et al. ... | 395/186 |
| 5,970,227 A | 10/1999 | Dayan et al. ............... | 395/186 |
| 5,991,537 A | 11/1999 | McKeon et al. ............ | 395/704 |
| 6,018,710 A | 1/2000 | Wynblatt et al. | |
| 6,026,360 A | 2/2000 | Ono ........................... | 704/260 |
| 6,029,146 A | 2/2000 | Hawkins et al. .............. | 705/35 |
| 6,030,226 A | 2/2000 | Hersh ......................... | 434/236 |
| 6,058,378 A | 5/2000 | Clark et al. .................... | 705/37 |
| 6,125,341 A | 9/2000 | Raud et al. ..................... | 704/8 |
| 6,144,723 A * | 11/2000 | Truchon et al. .......... | 379/88.01 |
| 6,173,259 B1 | 1/2001 | Bijl et al. .................... | 704/235 |
| 6,188,985 B1 | 2/2001 | Thrift et al. | |
| 6,192,476 B1 | 2/2001 | Gong ......................... | 713/201 |
| 6,226,495 B1 | 5/2001 | Neustein ................... | 455/31.2 |
| 6,243,684 B1 * | 6/2001 | Stuart et al. ................ | 704/275 |
| 6,275,789 B1 | 8/2001 | Moser et al. .................. | 704/7 |
| 6,286,102 B1 | 9/2001 | Cromer et al. .............. | 713/200 |
| 6,333,979 B1 | 12/2001 | Bondi et al. ................ | 379/219 |
| 6,343,270 B1 | 1/2002 | Bahl et al. .................. | 704/257 |
| 6,366,882 B1 | 4/2002 | Bijl et al. .................... | 704/235 |
| 6,408,272 B1 | 6/2002 | White et al. | |
| 6,412,070 B1 | 6/2002 | Van Dyke et al. .......... | 713/200 |
| 6,418,305 B1 | 7/2002 | Neustein ..................... | 455/406 |
| 6,442,519 B1 * | 8/2002 | Kanevsky et al. .......... | 704/243 |
| 6,456,975 B1 * | 9/2002 | Chang ..................... | 704/270.1 |
| 6,499,014 B1 | 12/2002 | Chihara ....................... | 704/260 |
| 6,658,414 B2 | 12/2003 | Bryan et al. | |

FOREIGN PATENT DOCUMENTS

| | | |
|---|---|---|
| EP | 558 222 | 8/1999 |
| EP | 683 483 | 11/2000 |
| EP | 1 113 417 | 7/2001 |
| EP | 1 160 648 | 12/2001 |
| WO | WO 01/09735 | 2/2001 |

OTHER PUBLICATIONS

Fitt, S. et al.; Synthesis of Regional English Using a Keyword Lexicon; Centre for Speech Technology Research.

Williams, B. et al.; A Keyvowel Approach to the Synthesis of Regional Accents of English; Centre for Speech Technology Research.

Black, A. et al.; Tongues: Rapid Development of a Speech-to-Speech Translation System; Language Technologies Institute.

Davis, J. et al.; Assigning Intonational Features in Synthesized Spoken Directions; AT&T Bell Laboratories; 1987.

Sproat, Richard; Multilingual Text Analysis for Text-to-Speech Synthesis; Speech Synthesis Research Department.

Wang. M. et al.; Automatic Classification of Intonational Phrase Boundries; Cambridge University; Jun. 1995.

Black. A. et al.; Limited Domain Synthesis; Language Technologies Institute.

Black, A. et al.; Assigning Phrase Breaks from Part-of-Speech Sequences; Centre for Speech Technology Research.

Hirschberg, Julia; Pitch Accent in Context: Predicting Intonational Prominence from Text; AT&T Bell Laboratories; Jun. 1995.

Black, A. et al.; Rapid Development of Speech-to-Speech Translation Systems; Language Technologies Institute Black, A. et al.; Rapid Development of Speech-to-Speech Translation Systems; Language Technologies Institute.

Wightman, C. et al.; Perceptually Based Automatic Prosody Labeling and Prosodically Enriched Unit Selection Improve Concatenative Text-to-Speech Synthesis; AT&T Laboratories.

Theune, M. Contrast In Concept-To-Speech Generation; Computer Speech and Language vol. 16, No. 3-4 p. 491-531; Jul.-Oct. 2002.

Yao Qian; Fang Chen ; Assigning Phrase Accent To Chinese Text-To-Speech System; IEEE , Piscataway, NJ, USA; 2002.

Muller, A.F.; Zimmermann, Symbolic Prosody Modeling By Causal Retro-Causal Nns With Variable Context Length; Springer-Verlag , Berlin, Germany; 2001.

Olaszy, G. The Prosody Structure Of Dialogue Components In Hungarian; International Journal of Speech Technology vol. 3, No. 3-4 p. 165-76; Dec. 2000.

Matsuoka, K.; Takeishi, E.; Asano, H.; Ichii, R.; Ooyama, Y. Natural Language Processing In A Japanese Text-To-Speech System For Written-Style Texts; IEEE , New York, NY, USA; 1996.

Tsukada, H.; Tanaka, K. Text Processing Techniques For Text-To-Speech Conversion Systems To Enhance The Quality Of Synthesized Speech; NTT R & D vol. 45, No. 10, p. 1011-18; 1996.

Ross, K.; Ostendorf, M. Prediction Of Abstract Prosodic Labels For Speech Synthesis; Computer Speech and Language vol. 10, No. 3 p. 155-85; Jul. 1996.

Kawai, H.; Higuchi, N.; Shimizu, T.; Yamamoto, S. Devoicing Rules For Text-To-Speech Synthesis Of Japanese; Journal of the Acoustical Society of Japan vol. 51, No. 9 p. 698-705; Sep. 1995.

Higuchi, N.; Shimizu, T.; Kawai, H.; Yamamoto, S. A Portable Text-To-Speech System Using A Pocket-Sized Formant Speech Synthesizer; IEICE Transactions on Fundamentals of Electronics, Communications and Computer Sciences vol. E76-A, No. 11 p. 1981-9; Nov. 1993.

Hirschberg, J. Pitch Accent In Context: Predicting Intonational Prominence From Text; Artificial Intelligence vol. 63, No. 1-2 p. 305-40; Oct. 1993.

Hirschberg, J. Accent And Discourse Context: Assigning Pitch Accent In Synthetic Speech; MIT Press , Cambridge, MA, USA; 1990.

Sagisaka, Y. On The Prediction Of Global F/Sub 0/ Shape For Japanese Text-To-Speech; IEEE , New York, NY, USA; 1990.

Monaghan, A.I.C.; Ladd, D.R. Symbolic Output As The Basis For Evaluating Intonation In Text-To-Speech Systems; Speech Communication vol. 9, No. 4 p. 305-14; Aug. 1990.

O'Shaughnessy, D. Specifying Accent Marks In French Text For Teletext And Speech Synthesis; International Journal of Man-Machine Studies vol. 31, No. 4 p. 405-14; Oct. 1989.

Sagisaka, Y. Speech Synthesis From Text; IEEE Communications Magazine vol. 28, No. 1 p. 35-41; Jan. 1990.

Baart, J.L.G. Focus And Accent In A Dutch Text-To-Speech System; Assoc. Comput. Linguistics , Morristown, NJ, USA; 1989 Baart, J.L.G. Focus And Accent In A Dutch Text-To-Speech System; Assoc. Comput. Linguistics , Morristown, NJ, USA; 1989.

Davis, J.R.; Hirschberg, J. Assigning Intonational Features In Synthesized Spoken Directions; Assoc. Comput. Linguistics , Morristown, NJ, USA; 1988.

Kitahara, Y.; Takeda, S.; Ichikawa, A.; Tohkura, Y. Role Of Prosody In Cognitive Process Of Spoken Language; Transactions of the Institute of Electronics, Information and Communication Engineers D vol. J70D, No. 11 p. 2095-101; Nov. 1987.

Miyazaki, M.; Ooyama, Y. Linguistic Processing In A Japanese Text-To-Speech System; Electrical Communication Laboratories Technical Journal vol. 35, No. 2 p. 157-67; 1986.

Rigoll, G. Development Of The German Version Of An American Test-To-Speech Converter; Media Dimensions , New York, NY, USA; 1985.

Miyazaki, M. Automatic Accent-Phrase Extraction Method For Compound Words Using Semantic Dependent Relationships Between Words; Transactions of the Institute of Electronics and Communication Engineers of Japan, Part D vol. J68D, No. 1 p. 25-32; Jan. 1985.

Sagisaka, Y.; Sato, H. Accentuation Rules For Japanese Text-To-Speech Conversion; Review of the Electrical Communication Laboratories vol. 32, No. 2, pt. 1 p. 188-99; Mar. 1984.

Sato, H. Japanese Text-To-Speech Conversion System; Review of the Electrical Communication Laboratories vol. 32, No. 2, pt. 1 p. 179-87; Mar. 1984.

Sagisaka, Y.; Sato, H. Japanese Word Concatenation Accentuation Rules For Text-To-Speech Conversion; Electrical Communication Laboratories Technical Journal vol. 32, No. 11, pt. 1 p. 2253-66 ; 1983.

Sagisaka, Y.; Sato, H. Accentuation Rules For Japanese Word Concatenation; Transactions of the Institute of Electronics and Communication Engineers of Japan, Part D vol. J66D, No. 7 p. 849-56 ; Jul. 1983.

Lesmo, L.; Mezzalama, M.; Torasso, P. A Text-To-Speech Translation System For Italian; International Journal of Man-Machine Studies vol. 10, No. 5 p. 569-9; Sep. 1978.

Avoid confusing messages caused by password filters; M. Keul; Windows Developer Magazine; Feb. 2002.

*A Global Semantics for Views*; Christine Choppy; Pascal Poizat; and Jean-Claude Royer, pp. 165-180 Spring 2000.

*Generic Extensions of WWW Browsers*; Ralf Hauser; and Michael Steiner; Jun. 23, 1995.

*The Future of Web-Based Workflows*; John A. Miller; Amit P. Sheth; Krys J. Kochut; and Devanand Palaniswami, Jul. 1997.

\* cited by examiner

TELEPHONE CALL HANDLING CENTER WHERE OPERATORS UTILIZE SYNTHESIZED VOICES GENERATED OR MODIFIED TO EXHIBIT OR OMIT PRESCRIBED SPEECH CHARACTERISTICS

BACKGROUND OF THE INVENTION

1. Field of the Invention

The present invention relates to call processing centers, such as those providing customer service, reservation assistance, help desk services, and other such arrangements where human operators answer customers' telephone calls and provide the appropriate service. More particularly, the invention concerns a telephone call handling center where operators listen to their respective callers, and instead of speaking directly to the callers, the operators utilize synthesized voices that are generated or modified to exhibit or omit accents, dialects, or other prescribed speech characteristics.

2. Description of the Related Art

In conducting day-to-day business, it is nearly impossible to avoid call processing centers. Despite various organizational differences, call processing centers generally use a number of human operators to answer customers' telephone calls and provide the appropriate service. Many call processing centers today also utilize machine-operated voice menus. From the customer's perspective, a call processing center appears to be a telephone number that is available to receive customers' calls to serve the appropriate business, e.g., airline reservations, credit card billing inquiries, utility services, product help desks, and the like.

Call processing centers enjoy widespread commercial success today. In fact, the call processing center is now an essential tool for any business that expects a significant volume of customer calls. Despite the admitted utility of call processing centers, there are substantial costs, most of which relates to staffing. Significant expenses are required to compensate employees, comply with legal mandates, provide health and pension benefits, manage personnel, and otherwise support call processing center employees.

Still, companies cannot survive without some professional means to facilitate contact with their customers. For companies that cannot afford a call processing center and its appropriate systems, there are some alternatives of lesser utility such as providing customers with e-mail support, Internet fill-in-the-blanks submission forms, using a nominal number of telephone operators, etc. For some customers, these approaches may be insufficient: some customers may lack e-mail or Internet access, some may find the e-mail/Internet submission processes to be cumbersome, and some customers may be frustrated with the long wait times of minimally staffed customer service departments.

In today's competitive business climate, companies that fail to provide a call processing center suffer a competitive disadvantage, and risk losing business. Consequently, known call processing centers may not be completely adequate for all applications due to certain unsolved problems.

SUMMARY OF THE INVENTION

Broadly, the present disclosure concerns call processing centers, where a number of human operators answer customers' telephone calls and provide the appropriate service such as customer service, reservations, technical support, and the like. In one example, a telephone call handling center is provided where operators listen to their respective callers, and instead of speaking directly to the callers, the operators utilize partially or completely synthesized output voices that are generated or modified to exhibit prescribed speech characteristics. For each caller, selection is made of one or more output voices each exhibiting prescribed speech characteristics. Some exemplary speech characteristics of output voices include presence or absence of accent, dialect, speech speed, speech patterns, pitch, tone, timbre, phrasing, vocabulary, word choice, male/female speaker, speaker age, speech particular to people of a particular geographic region or socioeconomic status or other grouping, etc. As still another option, some output voices may even sound like fictional characters (such as a cartoon character, alien invader, or robot) or a real-life celebrity.

As one example, the operator may indicate target speech content (e.g., via spoken word, selection of pre-prepared text, manual entry of text, or other means) to a speech processing facility, which generates an output voice with prescribed characteristics associated with that output voice. In another example, the speech processing facility intercepts the operator's speech, and manipulates the waveform representing the operator's intercepted speech to add or remove prescribed speech characteristics, and transmits an enunciated output of the manipulated waveform to the caller. In another embodiment, an automated call processing system is provided, where an output voice is selected for each incoming call, and information is interactively presented to callers using the output voice selected for their respective calls.

The foregoing features may be implemented in a number of different forms. For example, the invention may be implemented to provide a method to conduct voice communications, or a method to provide a call processing center, or a method to process incoming calls, etc. In another embodiment, the invention may be implemented to provide an apparatus such as a call processing center or one or more subcomponents. In still another embodiment, the invention may be implemented to provide a signal-bearing medium tangibly embodying a program of machine-readable instructions executable by a digital data processing apparatus to carry out some or all of at least one of the methods provided herein. Another embodiment concerns logic circuitry having multiple interconnected electrically conductive elements configured to carry out some or all of at least one of the methods provided herein.

The invention affords its users with a number of distinct advantages, which should be apparent from the following disclosure.

DETAILED DESCRIPTION OF THE INVENTION

The nature, objectives, and advantages of the invention will become more apparent to those skilled in the art after considering the following detailed description in connection with the accompanying drawings.

Hardware Components & Interconnections

Call Processing Center

Figure 1:
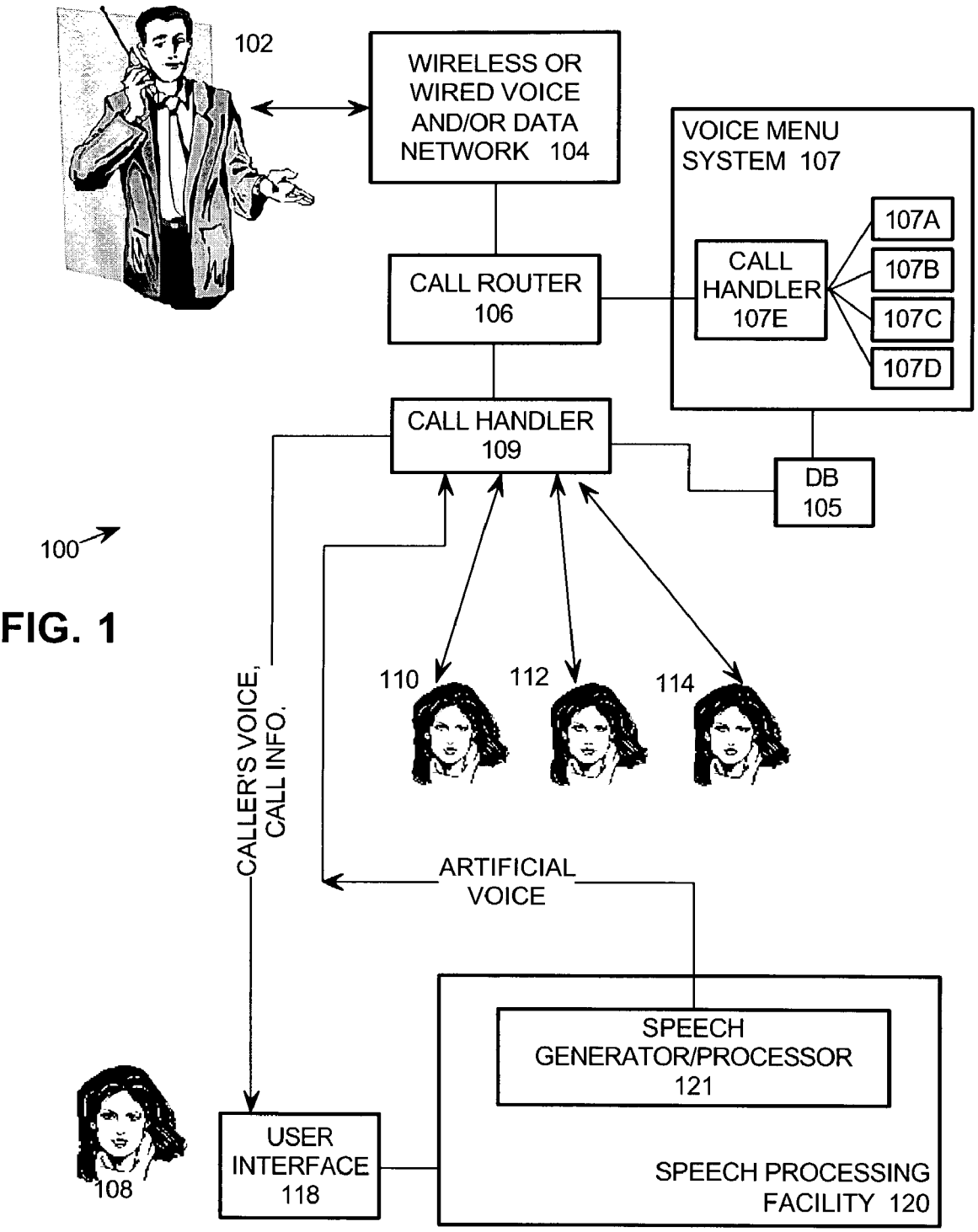
FIG. 1 is a block diagram of the hardware components and interconnections of a call processing center.

One aspect of this disclosure concerns a call processing center, also referred to by other names, such as a call handling center. The call processing center may be embodied by various hardware components and interconnections, with one example being the call processing center 100 described in FIG. 1. The center 100 includes components with various functionality, each of which may be implemented by one or more hardware devices, software devices, a portion of one or more hardware or software devices, or a combination of the foregoing. The makeup of these subcomponents is described in greater detail below, with reference to an exemplary digital data processing apparatus, logic circuit, and signal bearing medium. The call processing center 100 also employs various human subcomponents, such as the operators 108, 110, 112, 114.

Broadly, the call processing center 100 receives and processes arriving calls from customers such as 102. The customer 102 conducts communications using a telephone, computer, text-to-speech machine, keyboard, voice-over-IP device, or other device that enables the customer 102 to listen to voice prompts and other audible signals from the call processing center 100 and to submit entries in the form of voice (or simulated voice) utterances, DTMF signals, text entries, or other signals compatible with the call processing center 100 as described below. Without any intended limitation, communications between the customer 102 and the call processing center 100 are referred to as "telephone calls," although they might not be telephone calls in the traditional sense.

More particularly, calls are processed by various operators 108, 110, 112, 114. In the example of the operator 108, she processes calls with aid of a user interface 118 to a speech processing facility 120. Although not shown for ease of illustration, similar equipment is available for use by the other operators 110, 112, 114 in processing their respective calls.

More particularly, the call processing center 100 includes a call router 106, call handler 109, voice menu system 107, a user interface 118, and speech processing facility 120. Calls arrive at the call processing center 100 via a wired or wireless voice and/or data network 104, which comprises one (or a combination) of the following: the public switched telephone network (PSTN), cellular voice and/or data network, other wireless network, Internet, dedicated fiber optics, or another telephone or non-telephone communications network. For ease of description, these are illustrated as the network 104, which is external to the call processing center 100.

The network 104 receives a call from a caller 102, and routes the call to the appropriate telephone number, IP address, or other destination number. In the illustrated example, this is the telephone number of the call processing facility 100, and corresponds to the equipment at the call router 106. The call router 106 determines the appropriate call destination within the call processing center 100, directing incoming calls to the call handler 109 (for later delivery to the operators 108, 110, 112, 114) or to the voice menu system 107 as appropriate. The call router 106 may utilize known equipment, for example, one or more switching products from Nortel Corporation or Avaya Corporation. Alternatively, some or all switches of the router 106 may employ a custom designed product, such as a so-called "soft switch," which utilizes software combined with standard data processing systems to create desired switch functionality. Some custom switches, for example, may utilize technology of Dialogic Corporation.

The call router is coupled to the database 105, which contains a variety of information used by the call processing center. For instance, the database 105 may employ one or more software constructs (such as memory registers, lookup tables, linked lists, bits, bytes, pages, memory addresses or ranges, computer programs, artificial intelligence, expert systems, and the like), or hardware constructs (such as a hard disk, logical or physical portion of a hard disk, circuit memory, magnetic tape, or other storage device).

As one example, the database 105 contains data useful for components such as the call handler 107e and/or call handler 109 to determine the appropriate output voice to use for a given incoming call. In this respect, the database 105 may comprise an index relating various expected incoming call characteristics to the appropriate output voice to use. The database 105 may also contain various pre-recorded vocalizations of certain speech. The pre-recorded entries in the database 105 may be used, for example, to present the various options and information provided by the voice menu system 107 to its callers. The pre-recorded entries may also be called upon to effect quick, accurate pronunciation of certain expected target speech content that is hand-entered by the operators 108, as discussed in greater detail below.

The voice menu system 107 includes electronics to provide a customer-driven hierarchy of pre-recorded messages, which provide information themselves, or interactively determine the appropriate call routing, such as one of the operators 108-114 for call handling. As an alternative or additional feature, the voice menu system 107 may include an information delivery system, responsive to DTMF or voice command or other caller input to interactively provide information such as stock quotes, airline arrival times, sports scores, events listings, or any other information for which this is a useful delivery mechanism. For ease of discussion, without any intended limitation, "voice menu system" as used herein refers to any of the foregoing types of systems.

The voice menu system 107 may be implemented by known or even commercially available equipment, including subcomponents of computing, logic circuitry, microprocessing, telephony, or other nature. In the illustrated embodiment, the voice menu system 107 includes a call handler 107e, which consults a database 105 to determine the most appropriate output voice to use with the present caller 102, and then routes calls to the appropriate subsystem 107a-107d.

Each subsystem 107a-107d provides a different version of the voice menu, namely, one with a different output voice. Although only four subsystems 107a-107d are shown, there may be tens or hundreds, depending upon the specific implementation. Each subsystem 107a-107d may comprise different computing hardware, software threads, storage locations, processing unit, or other component. All subsystems 107a-107d are substantially identical, however each specialized voice menu system produces a different output voice by utilizing pre-recorded speech of different dialect, accent, or other prescribed speech characteristics of the same or different language. Each different subsystem 107a-107d may be embodied by different entries in digital data storage, or a separate voice menu equipment entirely, depending upon the requirements of the application at hand. As a storage-saving alternative, or based on perceived customer preference for one type of voice over another, the subsystems 107a-107d may serve to synthesize artificial voices of the respective speech characteristics rather than utilizing pre-recorded speech.

Operators 108-114 receive calls from a call handler 109, described below. Since technology disclosed herein enables the operators to speak with customers using speech patterns characteristic from the customer's geographical region (as one example), this enables operators to be located in one or even several sites around the world without the accent, dialect, and other speech problems that might be expected with operators in various nations abroad. Thus, the call processing center 100 may comprise a virtually integrated network, which actually provides call services from diverse sites of different countries around the world.

The call handler 109, from which the operators 108-114 receive assignment of their calls, consults the database 105 to determine the output voice to be used in communicating with each caller, and also manages hold status of calls until an operator 108-114 becomes available. The call handler 109 may comprise any appropriate digital data processing device, including subcomponents of computing, logic circuitry, microprocessing, or other nature.

As mentioned above, the operator 108 processes calls utilizing the user interface 118 to a speech processing facility 120. Activities of the operator 108 using the associated equipment 118, 120 are representative of the other operators 110, 112, 114 and their associated equipment (not shown). The operator 108 may listen to the caller 102 normally, for example, using a component of the user interface 108 resembling a telephone handset, headset, speaker phone, or other telephone-like device. In one example, this component of the user interface 118 may comprise a telephone stripped of its microphone and other components for conveying the operator's speech, since the operator's outgoing speech is provided by the facility 120 as discussed below. In this respect, the user interface 118 is coupled to the call router 106 in order to receive the caller 102's call.

The operator, however, does not normally speak directly to the caller 102. Instead, the operator indicates the desired target speech content to the speech processing facility 120, which enunciates the desired speech in the selected output voice. In this respect, the user interface 118 includes a device to sample the operator 108's speech (such as a microphone) and components to interface with the speech processing facility 120 (such as a computer keyboard, mouse, trackball, touch screen, eye-gaze monitoring equipment, video monitor, and the like). Optionally, the user interface 118 may utilize a microphone of a telephone if such a device is incorporated into the user interface.

In the illustrated example, the speech processing facility 120 includes a speech generator/processor 121. The generator/processor 121 generates a variety of different output voices, one being transmitted to the caller 102 in lieu of the operator 108's actual voice. The processor 121 is coupled to the call router 106 in order to transmit speech back to the caller 102 via the established call. The processor 121 may comprise various devices, with some examples being a computer server, computer workstation, personal computer, microprocessor, integrated circuit, circuit assembly, or other digital data processing tool.

Depending upon the requirements of the application at hand, the call processing center 100 may be implemented with both voice menu system 107 and the operators 108-114 (and their associated equipment) as illustrated, or one of these systems may be implemented separately. In other words, in the operator-based system, the voice menu system 107 may be omitted. And, in a strictly automated call processing system, the operators may be omitted.

Exemplary Digital Data Processing Apparatus

As mentioned above, data processing entities in the call processing system 100 may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement processing entities of the call processing center 100. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operation

Having described the structural features of the present invention, the operational aspect of the present invention will now be described. As mentioned above, this generally involves operating a telephone call handling center where operators listen to their respective callers, and instead of speaking directly to the callers, the operators utilize partially or completely artificial voices that are generated/modified to exhibit prescribed speech characteristics.

Signal-Bearing Media

Figure 2:
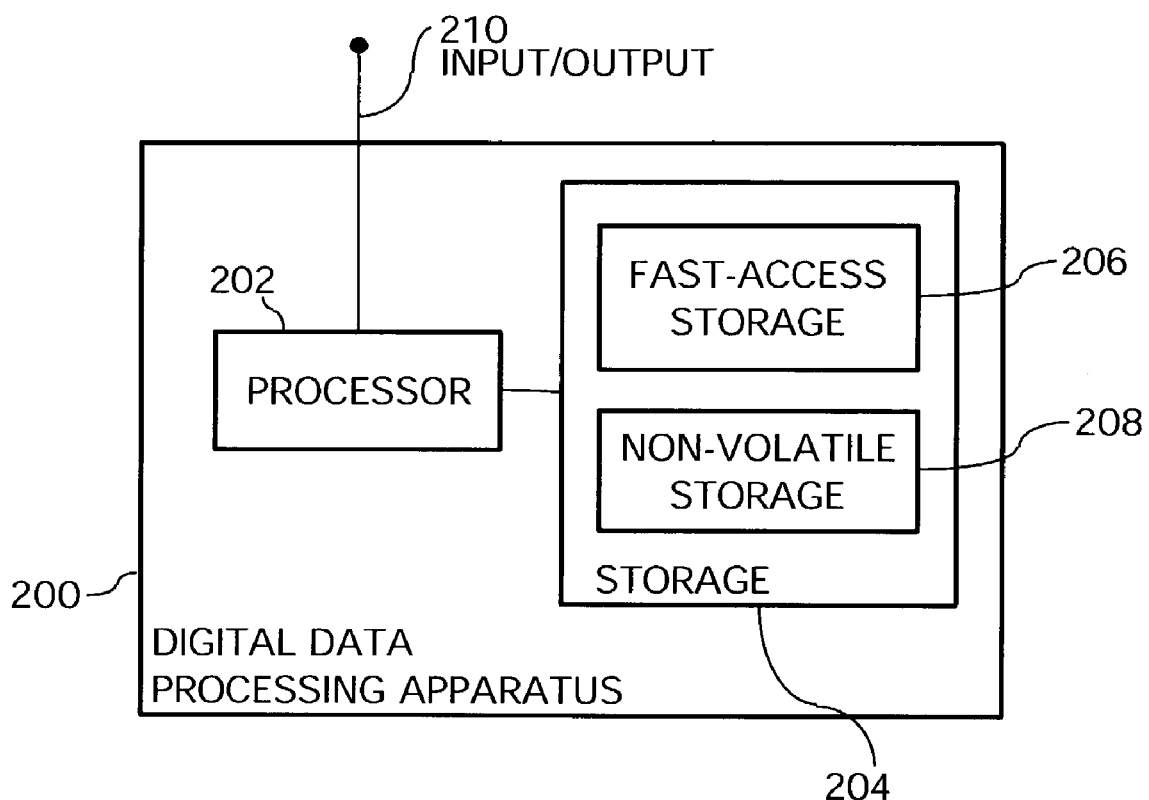
FIG. 2 is a block diagram of a digital data processing machine.
Figure 3:
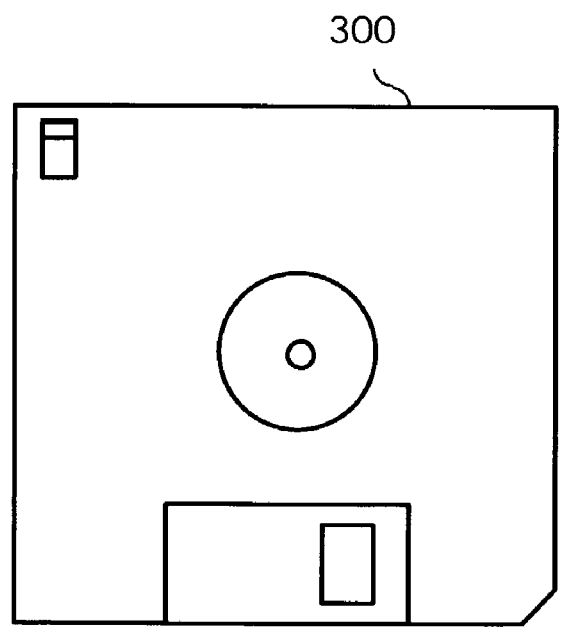
FIG. 3 shows an exemplary signal-bearing medium.

Wherever the functionality of the invention is implemented using one or more machine-executed program sequences, these sequences may be embodied in various forms of signal-bearing media. In the context of FIG. 2, such a signal-bearing media may comprise, for example, the storage 204 or another signal-bearing media, such as a magnetic data storage diskette 300 (FIG. 3), directly or indirectly accessible by a processor 202. Whether contained in the storage 206, diskette 200, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, NET, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Overall Sequence of Operation

Introduction

Figure 4:
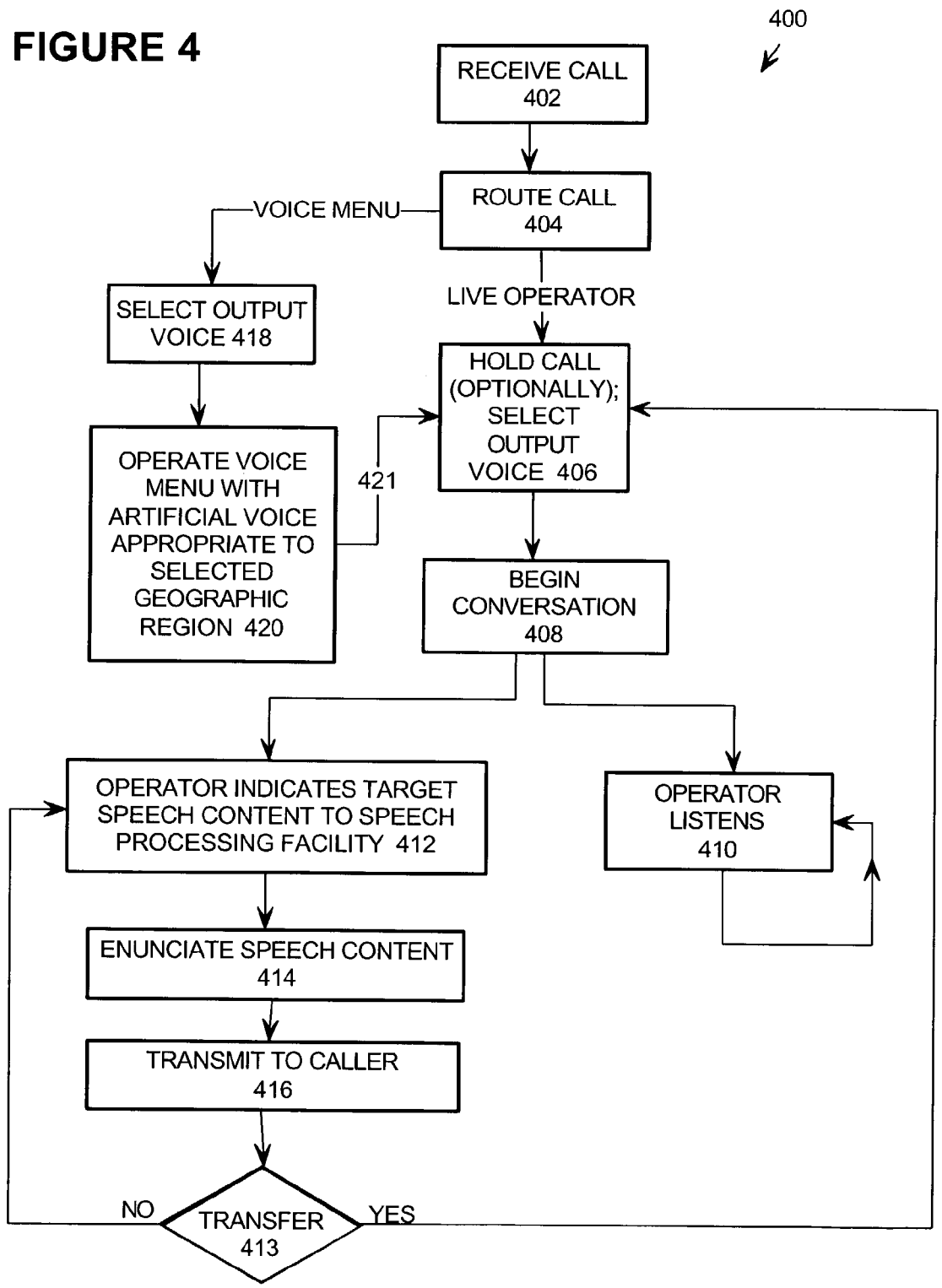
FIG. 4 is a flowchart of a sequence for operating a call processing center.

FIG. 4 shows an operational sequence 400 for a call processing center. For ease of explanation, but without any intended limitation, the example of FIG. 4 is described in the context of the call processing center 100 of FIG. 1, as described above. Initially, a call processing center is provided, including multiple human telephone operators along with various equipment as described in FIG. 1.

Call Routing

In step 402, the call processing center 100 receives an incoming call from the caller 102. Namely, the call router 106 receives the incoming call from the network 104. In step 404, the call router 106 routes the call to the voice menu system 107 or to the operators 108. Various known criteria may be used for choosing between the operators and the voice menu system in routing calls. For example, all incoming calls may be initially routed to the voice menu system 107. In another example, incoming calls are routed to the operators unless all operators are busy, and in that event, to the voice menu system 107. Call routing also depends on whether the call processing center 100 is implemented with both the voice menu system 107 and the operators 108-114, or one of these alone. The voice menu system 107 is discussed first.

Voice Menu System

In step 418, the voice menu system's call handler 107e identifies an output voice for use in presenting voice menu options to the caller. The output voice is identified by cross-referencing predetermined characteristics of the incoming call (described below) with the pre-prepared database 105. For example, the system 107 may consider characteristics of the incoming call such as (1) features of the call itself, such as the caller-ID, automatic number identification (ANI), dialed number information service (DNIS), or other source information, (2) voice and/or keypad (DTMF) submissions of the caller 102 during initial interaction with general/introductory messaging of the voice menu or during previous calls if the caller has identified him/herself by account number, PIN code, social security number, etc., (3) the telephone number dialed by the caller, (4) other helpful items that may be apparent to ordinarily skilled artisans having the benefit of this disclosure, or (5) a combination of these.

In step 418, then, the call handler 107e cross-references the incoming call characteristics with the database 105 to select an output voice from a list of numerous pre-designed output voices. Broadly, step 418 is performed in order to ultimately determine the best voice to use with the current caller 102. The pre-prepared list shows various voices, with different characteristics such as male/female, speed, tone, timber, phrasing, patterns, accent, dialect, vocabulary, word choice, acronym/abbreviation choices, and other linguistic features. Output voice characteristics may further include characteristics specific to a speakers of a particular geographical region, socioeconomic status, or other class or grouping. As still another option, the output voices may even sound like a fictional character (such as a cartoon character, supposed alien invader, or robot) or a real-life celebrity.

In the case of output voices from different geographical regions, some examples of distinct American English speech include Midwestern, Southeastern, New England, Southern, New York, etc. Although different American-English regions are discussed, this is merely to illustrate one example; the voice menu system 107 may select from database 105 entries of geographical regions around the world, for example, Indian English, British English, Canadian English, Australian English, and the regional variants of English within these nations. Moreover, output voices may be of different non-English languages, as well, such as Mandarin Chinese, Russian, Hindi, Spanish, German, etc., in which case step 418 additionally considers the caller's preferred tongue to choose an output voice of the appropriate language.

Step 418, then, selects the desired output voice. Some examples are discussed, illustrating the selection of specific output voices under different circumstances. As for male/female qualities of the output voice, an output voice of the same gender as the caller may be selected, or a gender that is generally known to be preferable in the industry or business transaction to which the present call pertains. If the caller is young girl, the output voice may be that of a cartoon character, and if the caller is a preteen boy, the output voice may be an alien invader. If the caller is from a particular geographic region (as indicated by the caller-ID number or address of record for the caller's account), an output voice with speech typical of that region may be used. For example, where the call originates from a Chicago area code, the call handler 107e in step 418 selects a Midwestern U.S. output voice. Similarly, in this embodiment, when the call originates from an Atlanta area code, the voice menu system 107 selects a Southeastern U.S. output voice. Also, where the caller 102 dialed a given number, the voice menu system 107 may select an accent-neutral American-English dialect, regardless of the call's place of origin; this may be appropriate for transactions regarding particular subject matter (such as banking) for which people may prefer to speak to a dialect-neutral operator.

Having selected the output voice in step 418, the voice menu system 107 in step 420 presents a voice menu to the caller, where speech information transmitted to each caller is enunciated using the output voice. Namely, the call handler 107e routes the call to a particular one of the subsystems 107a-107d corresponding to the desired output voice. For example, if the call handler 107e selected the Midwestern U.S. output voice in step 418, then the call handler 107e routes the call to the subsystem 107a-107d configured with Midwestern U.S. speech. Speech presented by the subsystems 107a-107d may be pre-recorded and/or artificially generated, depending upon the manner of implementing the subsystems 107a-107d.

In one case, step 420 concludes when the caller hangs up. In this event, the routine 400 ends. In another case, step 420 concludes when the caller opts to speak with a live operator, in which case step 420 advances to step 406 via 421. Namely, the call handler 107e hands the call to the router 106. At this point, the call handler 107e may also include a machine-readable message stating the already-selected output voice. In turn, the router 106 routes the call and identified output voice to the call handler 109, which proceeds according to step 406 and the ensuing operations 408-416 discussed in greater detail below.

Live Operators—Introduction

In contrast with the voice menu system described in steps 418-420 described above, step 404 alternatively utilizes live operators in steps 406-416 as discussed below. As mentioned above, various known criteria may be used for choosing between the operators and the voice menu system in routing calls. Having chosen to use a live operator, then, the call router 106 routes the present call to the call handler 109 in step 404.

In step 406, the call handler 109 begins processing the subject call. First, the call handler 109 (optionally) places or keeps the call on hold until one of the operators 108-114 is available to take the call; this may be performed using techniques that are well established in the relevant art. Next, the call handler 109 selects an output voice, using similar techniques as discussed above in conjunction with the actions of the voice menu call handler 107e in step 418. Output voice selection in step 406 may include additional considerations than were available in step 418, for example, basing some aspects of the output voice on characteristics of the operator 108. For example, the output voice may utilize the same gender as the operator. And, a more business-like output voice may be used for operators acting as supervisors, and more friendly voices for first-level customer service agents. As an alternative (or additional consideration) to selecting the output voice as shown above, if the present call was previously directed through the voice menu system 107 (steps 418/420/421), then the performance of step 406 may include receiving, considering, and/or adopting the voice menu system's selection of output voice.

When one of the operators 108-114 becomes available, the call handler 109 routes the call to that operator. This involves connecting the operator's telephone and speech processing facility to the caller, and also passing the identity of the selected output voice to the operator's speech processing facility. After this, a conversation between the caller 102 and operator ensues (step 408). The following discussion utilizes the example of a conversation between the caller 102 and operator 108.

In step 410, the operator 108 listens to the caller 102. The caller 102's voice is conveyed to the operator 108 via the network 104, call router 106, and user interface 118. Step 410 repeats continually, reflecting the fact that people normally listen continually during a telephone conversation with another person.

In contrast with the listening function of the operator (step 410), the speaking function is described by steps 412-416. Namely, instead of speaking directly to the remote caller 102, these operations 412-416 are performed with the aid of the speech generator/processor 121.

In step 412, the operator indicates his/her desired target speech content to the speech processing facility 120. In other words, the operator in step 412 provides a representation of the desired speech content to be sent to the caller. This is discussed in greater detail below. In step 414, the facility 120 enunciates the target speech content utilizing the output voice that was selected in step 406 (or earlier, in step 418). More technically, the facility 120 produces a signal representing an enunciation of the target speech, since the signal may not be audible until it reaches the caller; this act, nonetheless, may be referred to as enunciating the target speech content. The enunciation of the target speech content in the output voice exhibits various predefined characteristics particular to that voice, such as language, accent, dialect, speech rate, vocabulary, word selection, acronym/abbreviation use, patterns, pitch, tone, fictional character voice, speech particular to people of a particular geographic region or socioeconomic status or other grouping, or any other desired speech characteristic. In step 416, the speech processing facility 120 transmits (the signal representing the) enunciated output voice to the caller 102, for delivery via the call router 106 and network 104.

In step 413, the operator has the option to transfer the current call to another operator, or to begin using the operator's own natural voice to speak with the caller. In the case of transferring to another operator, the operator 108 operates the user interface 118 to place the call on hold and send the call to the desired operator. In the case of commencing natural voice speaking, the operator 108 transfers the call in the same way, identifying him/herself as the transferee and specifying "natural voice" as the desired output voice. In this case, the call handler 109 eventually returns the call to the operator 118, whereupon the speech processing facility 120 relays the operator 108's natural speech to the caller 102.

Alternatively, if the operator 108 does not initiate call transfer (step 413), then the operator 108 continues the activity of step 412. Several examples of step 412 and the resultant steps 414, 416 are now discussed in greater detail.

Live Operators—Computational Analysis & Modification of Operator's Vocalized Speech In this example, the operator indicates target speech content (step 412) by speaking into a microphone provided in the user interface 118. The target speech content (step 412) is made up of the operator's spoken words. The operator 118 may simply speak into the user interface 118, or additional actions such as pressing a transmit button may be required to avoid unintentional transmissions, this depending upon the configuration of the user interface 118.

In step 414, the speech generator/processor 121 applies a digital speech processing program, routine, algorithm, or other process to the operator's speech to yield speech in the output voice. More specifically, the generator/processor 121 receives or produces a digitized sampling of the operator's speech, and analyzes and modifies the digitized speech with mathematical or other computational processes in order to produce speech in the output voice. In one example of step 414, the generator/processor 121 analyzes the digitized sampling of the operator's speech to identify features that are inconsistent with the output voice, and removes these features and/or adds features of the desired speech pattern. This may involve computationally manipulating prescribed recognizable features of the digitized waveform in order to alter accent, dialect, speech speed, speech patterns, pitch, tone, timbre, phrasing, vocabulary, word choice, male/female speaker, speaker age, speech characteristics particular to people of a particular geographic region or socioeconomic status or other grouping, etc.

As a different or additional example of step 414, the generator/processor 121 may apply a speech recognition program to the operator's speech to produce a speech-to-text or other speaker-independent content representation, and thereafter apply a text-to-speech process to pronounce the content representation in the selected output voice. In one embodiment, the speech generator/processor 121 generates (synthesizes) speech from scratch utilizing a digital speech synthesis routine, with the output speech having characteristics of the desired output voice (as selected in step 406 or 418). In a different embodiment, the generator/processor 121 generates the desired speech by assembling digitally pre-recorded words and/or phrases. In this case, the generator/processor 121 is careful to select words/phrases from the correct pre-recorded library, that is, the library specifically corresponding to the selected output voice. In still another example, the generator/processor 121 searches the database 105 for an instances of the desired output voice pronouncing words or phrases of the operator's target speech content; the generator/processor 121 then prepares its output utilizing a combination of pre-recorded speech (for target speech content having a pre-recorded counterpart in the database 105) and speech synthesis (for target speech not found in pre-recorded form).

In step 414, then, the facility 120 enunciates the target speech content in the output voice that was selected in step 406 (or earlier, in step 418). Depending upon the manner of implementing the generator/processor 121, the output voice may be that of the operator (albeit modified to incorporate or omit certain speech characteristics) in one embodiment, or a completely synthesized voice in a different embodiment. In either case, the output voice may also be referred to as an "artificial voice." In order to perform such digital signal processing, the speech generator/processor 121 in this example may employ one or more devices such as microprocessors, personal computers, computer workstations, digital signal processing chips, application specific integrated circuits, etc.

Live Operators—Waveform Modification of Operator's Vocalized Speech

As with the previous example, the operator in this example indicates target speech content (step 412) by speaking into the user interface 118. The target speech content (step 412) is made up of the operator's spoken words. In step 414, the speech generator/processor 121 applies signal processing to the operator's speech in order to produce the output voice. The signal processing of step 414 analyzes an analog waveform representing the operator's speech and then removes or adds features to provide speech with characteristics of the desired output voice. More specifically, and in contrast with the digital signal processing in the previous example, this signal processing involves making technical modifications to an analog waveform, such as increasing or decreasing amplitude and frequency of the waveform in such a way that the waveform shape is modified. By contrast, the digital processing techniques (discussed above) involve digitizing the waveform and then modifying the resultant digital data stream using various algorithms and mathematical manipulations. In order to perform the analog signal processing of this example, the speech generator/processor may employ comprises devices such as amplifiers, frequency (tone) generators, clippers, reverberators, special effects tools used by studios, and the like; these are controlled by electronics that command these devices in a predefined way that is consistent with the desired resultant waveform.

Live Operators—Operator's Hand-Selected Speech Content

Unlike the previous examples, the operator in this example does not indicate target speech content (step 412) by speaking. Rather, the operator 108 in step 412 indicates the desired speech content indirectly by manipulating the user interface 118. For example, the operator 108 may utilize a keyboard to type the desired speech content, utilizing a mouse (or touch screen, eye-gaze system, voice-activated commands, foot pedal, or other input) to select desired output text content from a pull-down menu, scrolling window, simple list, or other on-screen text palette. In one particular example, the operator mainly selects output text from a menu or other palette, and occasionally uses a keyboard to enter words or phrases that are absent from the palette.

In step 414, the speech generator/processor 121 utilizes the operator's selected speech content to prepare a corresponding speech output in the selected output voice. In one embodiment, the speech generator/processor 121 generates (synthesizes) speech from scratch utilizing a digital speech synthesis routine, with the output speech having characteristics of the desired output voice (as selected in step 406 or 418). In a different embodiment, the generator/processor 121 generates the desired speech by assembling digitally pre-recorded words and/or phrases. In this case, the generator/processor 121 is careful to select words/phrases from the correct pre-recorded library, that is, the library specifically corresponding to the selected output voice. Both of the previous approaches may be referred to as "text-to-speech." In still another example, the generator/processor 121 searches the database 105 for an entry that comprises the desired output voice pronouncing the operator's target speech content. The generator/processor 121 then prepares its output utilizing a combination of pre-recorded speech (for target speech content having a pre-recorded counterpart in the database 105) and speech synthesis (for target speech not found in pre-recorded form).

Live Operators—Combination of Operator's Hand-Selected and Vocalized Speech Content As still another example of step 412, the operator may perform a combination of speaking and using the interface 118 to hand-select speech content. Some phrases may be spoken, others entered by menu selection, and others typed-in. For instance, the operator may enter desired speech content by simply speaking, but when the speech processing facility 120 fails to recognize a word or phrase, the operator may enter the desired content by menu and/or typing.

More Detailed Example

Using the routine 400 of FIG. 4, a more detailed example is described to further illustrate a practical example. For ease of explanation, but without any intended limitation, this example is described in the context of the call processing center 100 of FIG. 1, as described above. The equipment and personnel of the call processing center 100 is provided in Bombay, India, in order to benefit from the strong American dollar and reduced labor costs there.

In step 402, the call processing center 100 receives an incoming telephone call from the caller 102 via the PSTN, which constitutes the network 104 in this example. In step 404, the call router 106 directs the call to the voice menu system 107, since all calls are initially routed to the system 107 in this example.

In step 418, the call handler 107e tries to utilize the caller's ANI or caller-ID to identify the caller's geographical region, but such information is unavailable; thus, the call handler 107e proceeds to prompt the user for voice and/or keypad submissions to identify the caller by account, user name, PIN code, social security number, etc. In the present example, the caller 102 enters an account number.

Also in step 418, the call handler 107e cross-references the account number in the database 105, and learns that the user is from Victoria, Canada. Accordingly, the result of step 418 is that the call handler 107e selects a Canadian output voice (which is associated with a host of predefined speech characteristics, such as accent, dialect, speech rate, and any other prescribed characteristics).

Having selected the output voice in step 418, the voice menu system 107 in step 420 welcomes the caller to a voice menu that universally exhibits a Canadian speech pattern. This is done by routing the call to the particular one of the speech subsystems 107a-107d that utilizes a pre-recorded or artificially generated Canadian speech pattern.

When the caller proceeds sufficiently in the voice menu system to warrant invoking an operator, the call handler 107e routes the call to the router 106 (transition 421). The call handler 107e also provides the router 106 with a machine-readable message stating the identified output voice is "Canadian." In turn, the router 106 routes the call and selected geographical region to the call handler 109, which proceeds according to step 406 and the ensuing operations 408-416.

In step 406, the call handler 109 begins processing the subject call. First, the call handler 109 places or keeps the call on hold, if necessary, which may be performed using techniques that are well established in the relevant art. Next, the call handler 109 recognizes that the designated output voice is Canadian, since this information was already provided by the voice menu's call handler 107e.

When the operators 108 becomes available, the call handler 109 routes the call to that operator, and more particularly, connects the caller 102 with the user interface 118 (the operator's ear) and speech processing facility 120 (the operator's mouth).

In step 410, the operator 108 listens to the caller 102. The caller 102's voice is continually conveyed to the operator 108 via the network 104, call router 106, and user interface 118.

In contrast with the listening function of the operator (step 410), the speaking function is described by steps 412-416. Namely, instead of speaking directly to the remote caller 102, these operations 412-416 are performed with aid of the speech generator/processor 121. In step 412, the operator 108 mainly selects output text from a menu or other palette, and occasionally uses a keyboard to enter words or phrases that are absent from the palette. In step 414, the speech generator/processor 121 enunciates the target speech content selected by the operator, in a paradigm Canadian output voice. Where a match of the target speech content is available in the correct voice in the database 105, the speech generator/processor 121 replays such pre-recorded speech entries from the database 105. Where pre-recorded entries cannot be found, the speech generator/processor 121 enunciates the operator's target speech content using its speech synthesis ("text to speech") subcomponent. In step 416, the facility 120 transmits output of the speech generator/processor 121 to the caller via the call handler 109, router 106, and network 104.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To illustrate one exemplary embodiment, various functional aspects of the invention have been described in terms of illustrative components, blocks, modules, circuit, and steps. Whether such functionality is implemented as hardware, software, or both depends upon the particular application and design constraints imposed on the overall system. Skilled artisans may implement the described functionality in varying ways for each particular application without such implementation decisions departing from the scope of the present invention.

What is claimed is:

1. A method for conducting voice communications, comprising operations of:
    a human operator receiving telephone calls from a variety of remote callers over time;
    for each particular call from a caller, performing operations comprising:
        selecting an output voice that exhibits prescribed speech characteristics appropriate to that particular call;
        the human operator listening to voice utterances of the caller;
        instead of the operator speaking to the caller, performing operations comprising:
            the operator selecting target speech content to be conveyed to the caller;
            the operator directing a representation of the selected target speech content to a speech processing facility;
            the speech processing facility producing a signal representing an enunciation of the target speech content utilizing the selected output voice;
            transmitting the signal to the caller.

2. The method of claim 1, where the act of receiving telephone calls comprises one or more of the following: receiving a voice-over-IP calls, receiving voice wireless communications, receiving calls from landline telephones, receiving satellite telephone calls, receiving voice signals via dedicated data communications circuit, receiving voice signals via shared data communications circuit.

3. The method of claim 1, the operation of selecting an output voice comprises selecting an output voice with prescribed speech characteristics particular to people of one of the following groups: a geographic region, another specified group.

4. The method of claim 1, where the operation of selecting an output voice comprises selecting an output voice with prescribed speech characteristics that include one or more of the following: accent, dialect, vocabulary, word choice, speech rate, pitch, tone, timbre, gender, language.

5. The method of claim 1, where the operation of selecting an output voice comprises selecting an output voice with prescribed speech characteristics of a specified fictional character.

6. The method of claim 1, where:
the directing operation comprises the operator speaking the target speech content to the speech processing facility;
the producing operation comprises performing speech recognition upon the target speech content spoken by the operator in order to yield a speech-to-text output, and applying a speech synthesis process to enunciate the speech-to-text output utilizing the selected output voice.

7. The method of claim 1, where:
the directing operation comprises the human operator performing at least one of the following: designating pre-prepared text from a display palette, designating text via manual character entry;
the producing operation comprises applying a speech synthesis process to the designated text.

8. The method of claim 1, where the operation of selecting the output voice comprises:
identifying a target geographical region by indexing at least one of the following in a pre-prepared database: (1) an originating telephone number of the caller, (2) identity of the caller, (3) a telephone number dialed by the caller, (4) a billing account associated with the caller, (5) information submitted by the caller during the call;
choosing an output voice having speech characteristics of speakers from the target geographical region.

9. The method of claim 1, the operations of selecting the output voice comprising:
selecting an output voice exhibiting prescribed characteristics of speech appropriate to one or more of the following features of the human operator: gender of the operator, level of supervisory authority of the operator, another feature associated with the operator.

10. The method of claim 1, further comprising operations of:
the human operator reconfiguring the call so that the operator speaks to the caller in the operator's own voice.

11. The method of claim 1, the producing operation comprising:
searching a database for a pre-recorded vocalization of the target speech content utilizing the selected output voice;
replaying pre-recorded vocalizations of any target speech content found in the database, and synthesizing vocalizations of target speech absent from the database.

12. The method of claim 1, where:
the direction operation comprises the operator speaking the target speech content to the speech processing facility;
the producing operation comprises the speech processing facility manipulating a waveform representing the operator's speech to change features of the waveform that correspond to prescribed characteristics of the operator's speech.

13. A signal-bearing medium tangibly embodying a program of machine-readable instructions executable by a digital processing apparatus to perform operations for conducting a call between an operator and a remote caller, the operations comprising:
receiving designation of an output voice that exhibits prescribed speech characteristics;
receiving from the operator a representation of target speech content to be conveyed to the caller;
producing a signal representing an enunciation of the target speech content utilizing the designated output voice for transmission to the caller instead of the operator's own voice.

14. The medium of claim 13, where the producing operation is conducted such that the output voice exhibits prescribed speech characteristics particular to people of one of the following groups: a geographic region, another specified group.

15. The medium of claim 13, where the producing operation is conducted such that the output voice exhibits prescribed speech characteristics that include one or more of the following: accent, dialect, vocabulary, word choice, speech rate, pitch, tone, timbre, gender, language.

16. The medium of claim 13, where the producing operation is conducted such that the output voice exhibits prescribed speech characteristics of a specified fictional character.

17. The medium of claim 13, where:
the operation of receiving the representation of target speech content comprises receiving a signal representing the operator speaking the target speech content;
the producing operation comprises performing speech recognition upon the signal in order to yield a speech-to-text output, and applying a speech synthesis process to enunciate the speech-to-text output utilizing the designated output voice.

18. The medium of claim 13, where:
the operation of receiving the representation of target speech content comprises at least one of the following: receiving pre-prepared text selected from a display palette, receiving text selected via manual character entry;
the producing operation comprises applying a speech synthesis process to the received text.

19. The medium of claim 13, where the operation of receiving designation of an output voice comprises:
receiving designation of an output voice that that exhibits prescribed speech characteristics of speakers from a target geographical region identified by indexing at least one of the following in a pre-prepared database: (1) an originating telephone number of the caller, (2) identity of the caller, (3) a telephone number dialed by the caller, (4) a billing account associated with the caller, (5) information submitted by the caller during the call.

20. The medium of claim 13, where the operation of receiving designation of an output voice comprises receiving designation of an output voice that exhibits prescribed characteristics of speech appropriate to one or more of the following features of the human operator: gender of the operator, level of supervisory authority of the operator, another feature associated with the operator.

21. The medium of claim 13, further comprising operations of:
   responsive to input from the operator, reconfiguring the call to convey a natural voice of the operator to the caller.

22. The medium of claim 13, the producing operation comprising:
   searching a database for a pre-recorded vocalization of the target speech content utilizing the designated output voice;
   replaying pre-recorded vocalizations of any target speech content found in the database, and synthesizing vocalizations of target speech absent from the database.

23. The medium of claim 13, where:
   the operation of receiving the representation of target speech content comprises receiving a signal representing the operator speaking the target speech content;
   the producing operation comprises the speech processing facility manipulating a waveform provided by the signal to change features of the waveform that correspond to prescribed characteristics of the operator's speech.

24. Circuitry comprising multiple interconnected electrically conductive elements configured to perform operations for conducting a call between an operator and a remote caller, the operations comprising:
   receiving designation of an output voice that exhibits prescribed speech characteristics;
   receiving from the operator a representation of target speech content to be conveyed to the caller;
   producing a signal representing an enunciation of the target speech content utilizing the designated output voice;
   transmitting the signal to the caller instead of the operator's own voice.

25. A call processing center for processing telephone calls between an operator and a variety of remote callers over time, comprising:
   a call handler configured to select an output voice that exhibits prescribed speech characteristics appropriate to each call;
   a user interface configured to convey voice utterances of the caller to an operator and, instead of conveying speech of the operator to the caller, receiving selection by the operator of target speech content to be conveyed to the caller and directing a representation of the selected target speech content to a speech processing facility;
   a speech processing facility configured to produce a signal representing an enunciation of the target speech content utilizing the selected output voice for transmission to the caller.

26. A call processing center for processing telephone calls between an operator and a variety of remote callers over time, comprising:
   a call handling means for selecting an output voice that exhibits prescribed speech characteristics appropriate to each call;
   user interface means for conveying voice utterances of the caller to an operator and, instead of conveying speech of the operator to the caller, receiving selection by the operator of target speech content to be conveyed to the caller and directing a representation of the selected target speech content to a speech processing facility;
   speech processing means for producing a signal representing an enunciation of the target speech content utilizing the selected output voice for transmission to the caller.

27. A method for conducting voice communications, comprising operations of:
   a human operator listening to voice utterances of a remote caller;
   instead of speaking directly to the caller, performing operations comprising:
      a speech processing facility intercepting speech of the operator;
      the speech processing facility manipulating a waveform representing the operator's intercepted speech to change features of the waveform that correspond to prescribed characteristics of the intercepted speech;
      transmitting a signal representative of the manipulated waveform to the caller.

28. The method of claim 27, where the prescribed characteristics include at least one of the following: accent, dialect, speech rate, pitch, tone, timbre, gender.

29. The method of claim 27, where the manipulating operation comprises at least one of the following:
   removing prescribed characteristics of the intercepted speech;
   adding prescribed characteristics to the intercepted speech.

30. A signal bearing medium tangibly embodying a program of machine readable instructions executable by a digital data processing apparatus to perform operations for conducting voice communications between an operator and a remote caller, the operations comprising:
   intercepting speech of the operator;
   manipulating a waveform representing the operator's intercepted speech to change features of the waveform that correspond to prescribed characteristics of the intercepted speech;
   transmitting a signal representative of the manipulated waveform to the caller instead of the operator's speech.

31. The medium of claim 30, where the prescribed characteristics include at least one of the following: accent, dialect, speech rate, pitch, tone, timbre, gender.

32. The medium of claim 30, where the manipulating operation comprises at least one of the following:
   removing prescribed characteristics of the intercepted speech;
   adding prescribed characteristics to the intercepted speech.

33. Circuitry comprising multiple interconnected electrically conductive elements configured to perform operations for conducting voice communications between an operator and a remote caller, the operations comprising:
   intercepting speech of the operator;
   manipulating a waveform representing the operator's intercepted speech to change features of the waveform that correspond to prescribed characteristics of the intercepted speech;
   transmitting a signal representative of the manipulated waveform to the caller instead of the operator's speech.

34. A speech processing facility, comprising:
   data storage;
   a digital data processor coupled to the storage and programmed to perform operations to produce output speech to a remote caller under direction of an operator, the operations comprising:
      receiving input selecting an output voice that exhibits prescribed speech characteristics;
      receiving a representation of operator-selected target speech content in at least one of the following forms: output text selected via manual character entry, pre-prepared output text selected from a display pallet, operator utterance of the target speech content;

producing a signal representing an enunciation of the target speech content utilizing the selected output voice by performing at least one of the following: (1) applying a speech-to-text process to the operator's utterances to yield output text and then applying a text-to-speech process to the output text in order to enunciate speech in the output voice, (2) manipulating a waveform representing the operator's utterances to change features of the waveform that correspond to prescribed characteristics of the intercepted speech, (3) applying a text-to-speech process to output text indicated by the operator in order to enunciate speech in the output voice;

transmitting the produced signal to the caller in lieu of the operator's own voice.

35. A speech processing facility, comprising:

means for data storage;

digital data processing means for producing output speech to a remote caller under direction of an operator, by:
receiving input selecting an output voice that exhibits prescribed speech characteristics;

receiving a representation of operator-selected target speech content in at least one of the following forms: output text selected via manual character entry, pre-prepared output text selected by selection from a display pallet, operator utterance of the target speech content;

producing a signal representing an enunciation of the target speech content utilizing the selected output voice by performing at least one of the following: (1) applying a speech-to-text process to the operator's utterances to yield output text and then applying a text-to-speech process to the output text in order to enunciate speech in the output voice, (2) manipulating a waveform representing the operator's utterances to change features of the waveform that correspond to prescribed characteristics of the intercepted speech, (3) applying a text-to-speech process to output text indicated by the operator in order to enunciate speech in the output voice;

transmitting the produced signal to the caller in lieu of the operator's own voice.

36. A method of conducting a call between an operator and a remote caller, the operations comprising:

receiving designation of an output voice that exhibits prescribed speech characteristics;

receiving from the operator a representation of target speech content to be conveyed to the caller;

producing a signal representing an enunciation of the target speech content utilizing the designated output voice for transmission to the caller instead of the operator's own voice.

37. A call processing method, comprising:

providing an automated call processing system;

the call processing system receiving incoming calls and, for each incoming call from a caller, performing operations comprising:

selecting an output voice by indexing predetermined characteristics associated with the call in a pre-prepared database;

responsive to input from the caller, interactively outputting information to the caller by enunciating the information utilizing the output voice selected for that caller.

38. The method of claim 37, each output voice exhibiting prescribed characteristics of speech comprising at feast one of the following:

accent, dialect, vocabulary, word choice, speech rate, pitch, tone, timbre, gender, language.

39. The method of claim 37, each output voice exhibiting prescribed characteristics of speech particular to people of one of the following groups: a geographic region, another specified group.

40. The method of claim 37, where the operation of providing an automated call processing system comprises at least one of the following: providing a voice menu system, providing an interactive information database driven by caller-directed query.

41. The method of claim 37, the operation of interactively outputting information comprises:

outputting information responsive to one or more of the following caller inputs: DTMF input, voice utterance.

42. The method of claim 37, the enunciating operation comprising at least one of the following:

synthesizing speech;

transmitted pre-recorded speech.

43. An automated call processing system for processing telephone calls received from remote callers, comprising:

a call handler responsive to each incoming call from a caller to select an output voice by indexing predetermined characteristics associated with the call in a pre-prepared database;

a voice menu system, responsive to input from each caller during a call, to interactively output information to that caller by enunciating the information utilizing the output voice selected for that call.

44. The system of claim 43, each output voice exhibiting prescribed characteristics of speech comprising at least one of the following:

accent, dialect, vocabulary, word choice, speech rate, pitch, tone, timbre, gender, language.

45. The system of claim 43, each output voice exhibiting prescribed characteristics of speech particular to people of one of the following groups: a geographic region, another specified group.

46. The system of claim 43, where voice menu system further comprising an interactive information database driven by caller-directed query.

47. The system of claim 43, the operation of interactively outputting information comprises:

outputting information responsive to one or more of the following caller inputs: DTMF input, voice utterance.

48. The system of claim 43, the enunciating operation comprising at least one of the following:

synthesizing speech;

transmitted pre-recorded speech.

* * * * *